United States Patent [19]

Moerke

[11] 4,158,763
[45] Jun. 19, 1979

[54] CURVED NOZZLE WELDING GUN

[76] Inventor: Delford A. Moerke, 127 E. Morningside Ave., Lombard, Ill. 60148

[21] Appl. No.: 821,743

[22] Filed: Aug. 4, 1977

[51] Int. Cl.$^2$ .............................................. B23K 9/28
[52] U.S. Cl. ................................. 219/137.42; 219/74; 219/137.44; 219/137.62; 219/137.63
[58] Field of Search ...................... 219/137.62, 137.42, 219/137.44, 74, 137.62, 137.63

[56] References Cited

U.S. PATENT DOCUMENTS

| | | | |
|---|---|---|---|
| 2,952,766 | 9/1960 | Craig | 219/137.42 |
| 3,112,392 | 11/1963 | Orr | 219/137.42 |
| 3,249,734 | 5/1966 | Meyer | 219/137.8 X |
| 3,463,902 | 8/1969 | Bircher | 219/137.62 X |
| 3,529,127 | 9/1970 | Smith | 219/137.9 |
| 3,536,888 | 10/1970 | Borneman | 219/137.44 X |
| 3,689,733 | 9/1972 | Matasovic | 219/136 |
| 3,783,233 | 1/1974 | Molin | 219/137.61 |
| 3,980,860 | 9/1976 | Howell | 219/137.62 |

*Primary Examiner*—Richard R. Kucia
*Attorney, Agent, or Firm*—George F. Lee

[57] ABSTRACT

A welding gun has a separable nozzle embodying longitudinally curved inner and outer concentric sleeves, and fore and aft-mounted bodies to which the opposed ends of the concentric sleeves are brazed to define an annular gas manifold between the sleeves into which gas feeds through the aft-mounted body. The aft-mounted body detachably seats within a tubular handle and it contains a bore through which the consumable wire electrode feeds to the central bore of the inner sleeve. The fore-mounted body provides for connection of an adapter by which a current pickup tube is fixed to the curved nozzle in line with its inner sleeve to receive the wire electrode. Said fore-mounted body is ported at spaced intervals for discharge of gas from the manifold through the adapter and about the current pickup tube when assembled thereto. In an alternate structure, inlet and outlet tubes ported through the aft-mounted body follow closely along the outer sleeve to provide passage for cooling fluid to and from an annular chilling chamber fixed about the forward end of the nozzle. The outer sleeve, and in the alternate structure also the cooling chamber and its inlet and outlet tubes, are enclosed along the length of the nozzle by a snugly fitting insulative sheath.

26 Claims, 20 Drawing Figures

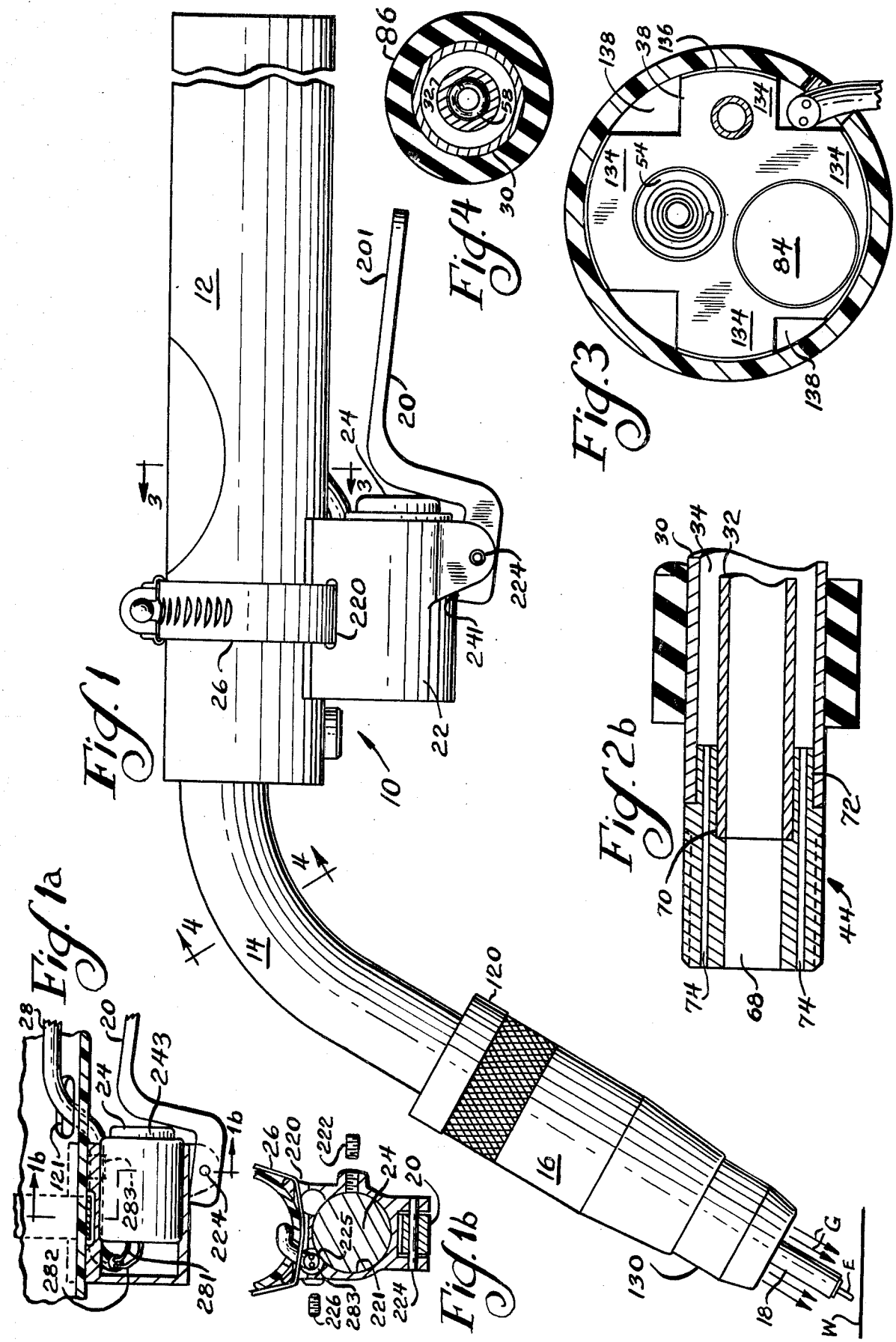

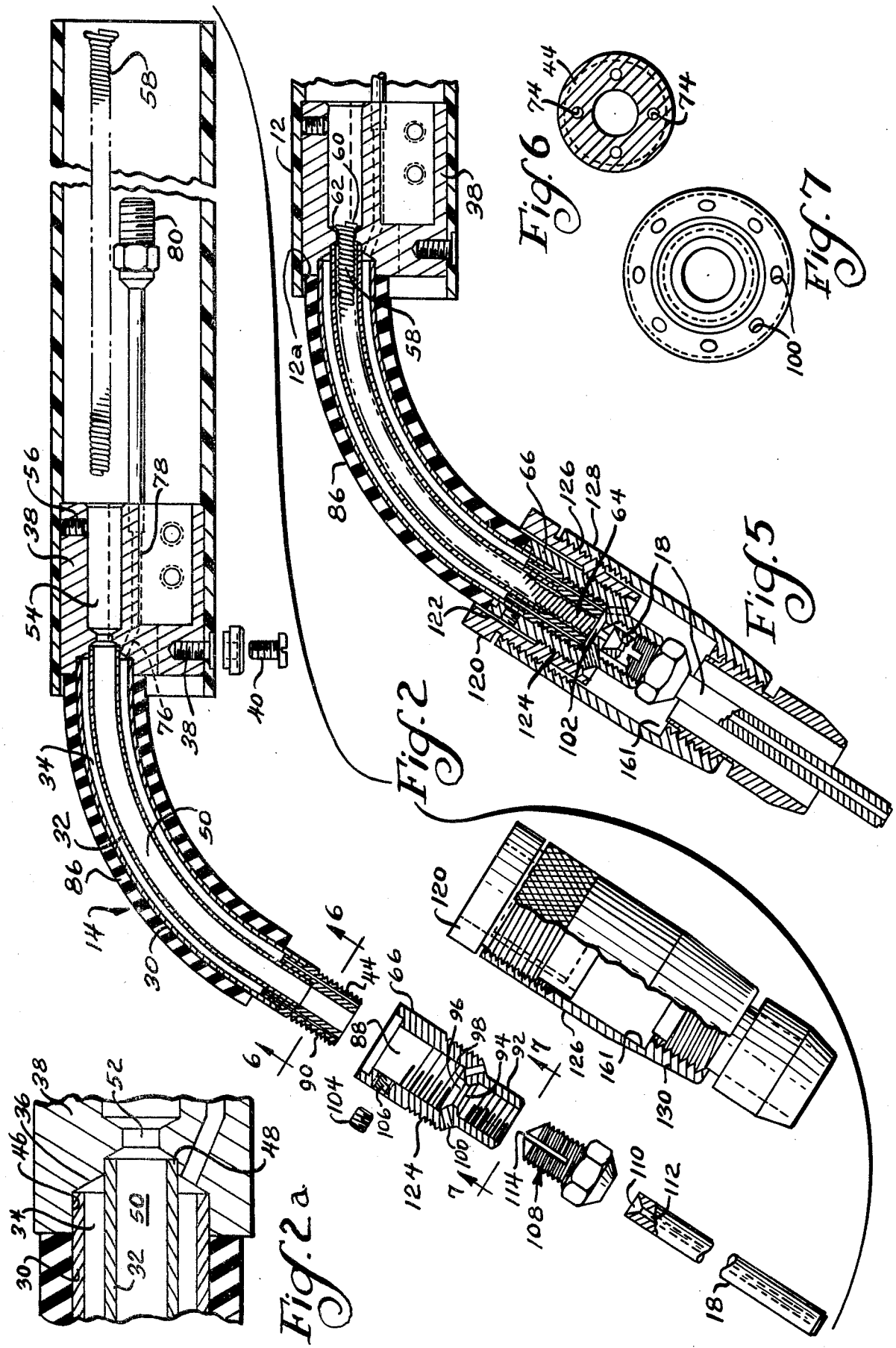

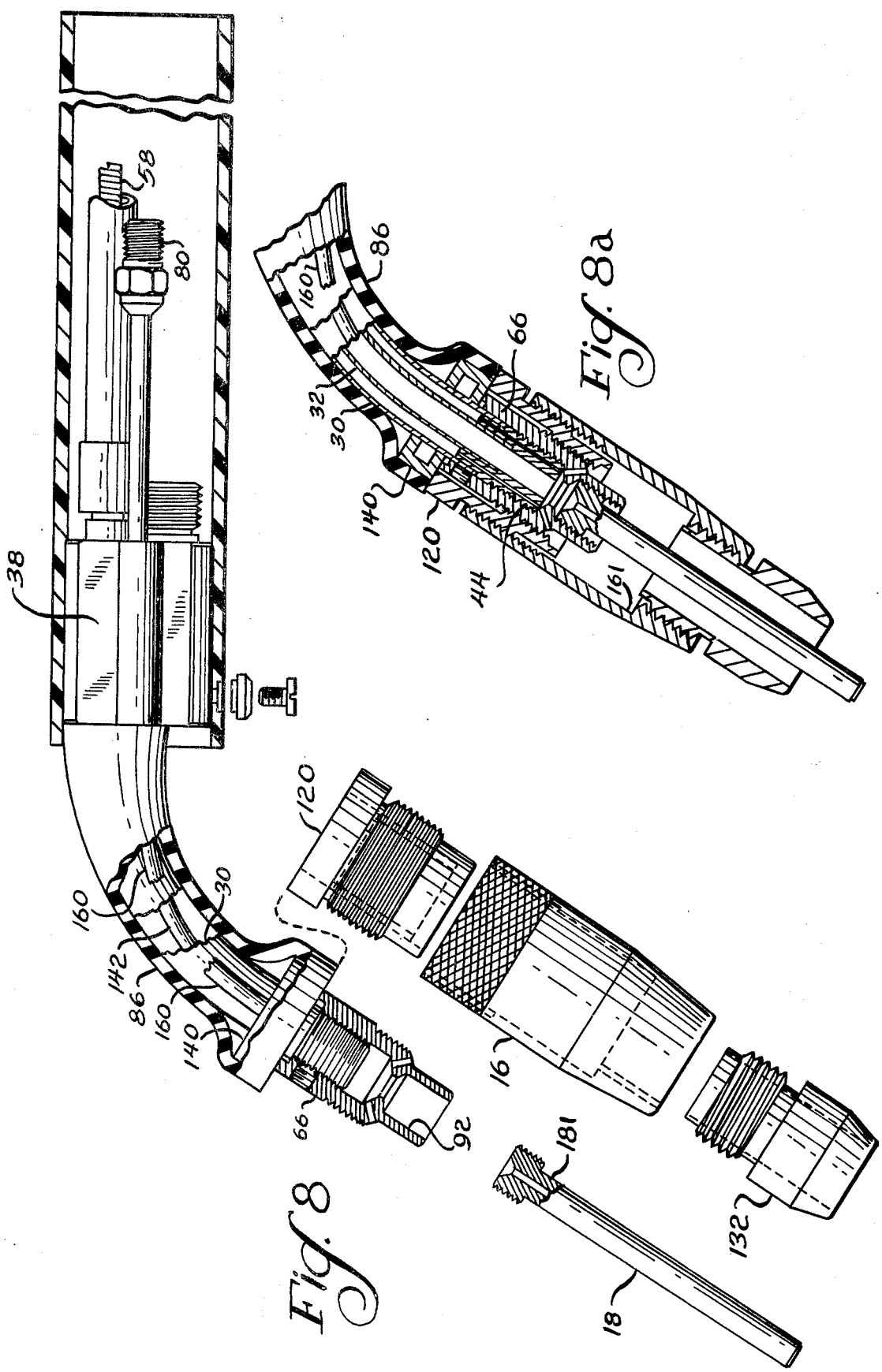

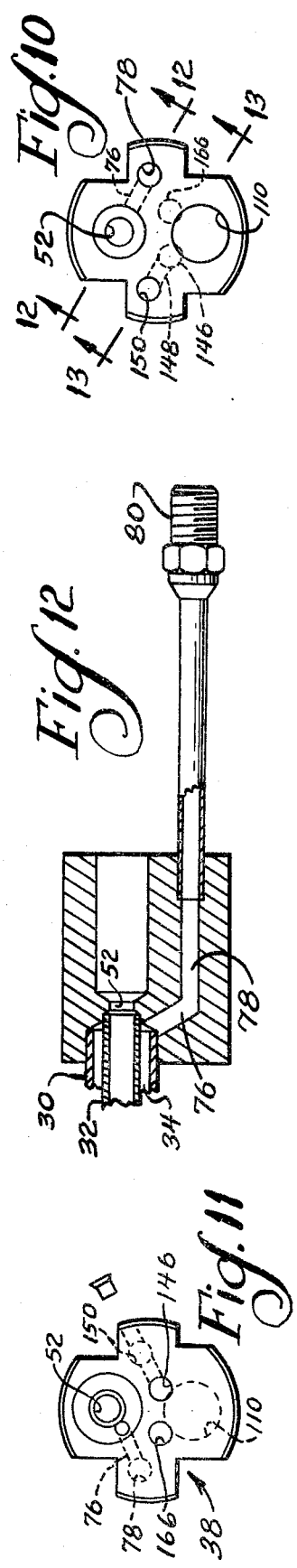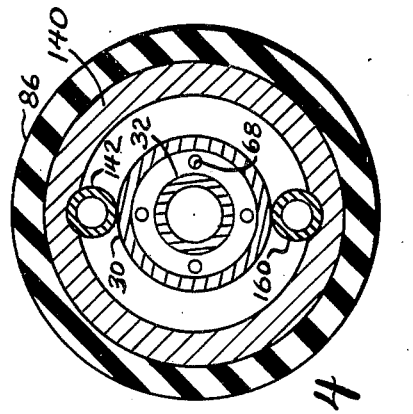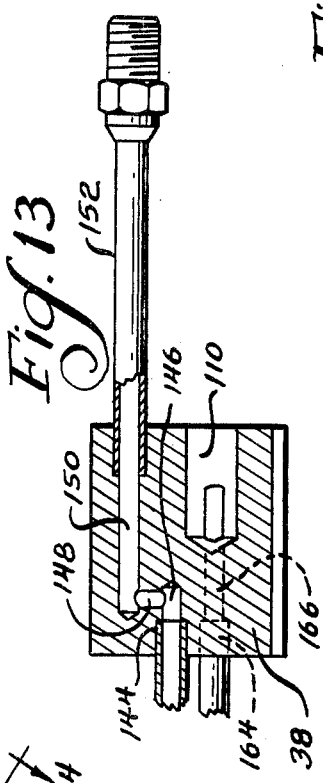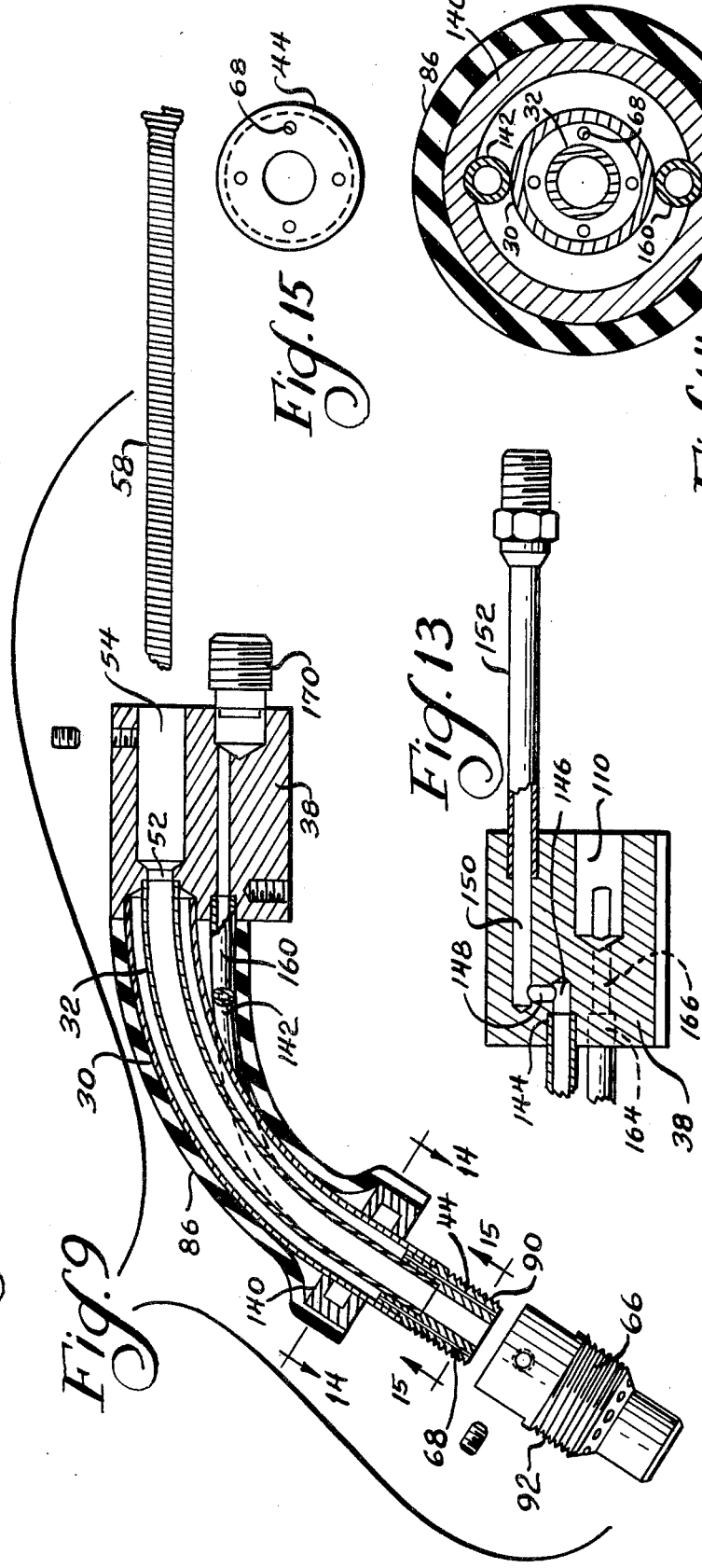

CURVED NOZZLE WELDING GUN

This invention relates to welding guns and more particularly to a novel and improved construction of curved nozzle therefor which is readily separable into its component parts for convenience and economy in repair, at the same time is rigid and rugged in its construction and is versatile in its adaptation to varying welding requirements, as for example, to accommodate different electrode thicknesses and current pickup tube lengths.

In my earlier issued U.S. Pat. No. 3,496,328, the nozzle of a welding gun is described as comprising an inner nozzle body having a wire electrode feeding bore therethrough and an outer nozzle body in spaced encircling relation thereabout, the nozzle bodies having series-connected water-cooled chambers extending lengthwise thereof. The inner nozzle body has an encircling laterally flanged end portion which is secured within the gun handle and the outer nozzle body has an encircling lateral mounting flange which is clamped against the inner nozzle body flanged end by a suitably-shaped nut which threadedly connects to the gun handle. The flanged end portions of the two nozzles are suitably ported so that gas may flow therethrough into the space between the two nozzle bodies and be discharged therefrom about a current pickup tube connected to the outer end of the inner nozzle body.

In my U.S. Pat. No. 3,775,584, I disclose an improvement in which the inner nozzle body is similarly assembled with the outer nozzle body but itself comprises a gas distributing member which is ported through its flanged end portion to the supply hose and discharges the gas short of its forward end into the central bore of the surrounding outer nozzle body.

In Craig, et al, U.S. Pat. No. 2,952,766, the nozzle of the disclosed welding gun embodies an elongated longitudinally-curved metal member having a central passage therethrough for the wire electrode and long lengthwise extending gas passages in its surrounding wall radially spaced about said wire electrode passage. The wire guide has a reduced end which seats in a provided socket of a mounting body to which the gun handle is fixed and is releaseably clamped to the mounting body by a nut which threadedly connects to the handle, an O-ring sealed, narrow gas manifold being thereby provided about the reduced end which is ported to a gas supply through the mounting body and in turn discharges through the gas passages of the wire guide member into the interior of a gas nozzle assembled over and about the end of the wire guide tube.

In Bernard et al, U.S. Pat. No. 3,803,381, the disclosed welding gun has a longitudinally curved current conducting portion with a central bore through which the wire electrode and shielding gas are fed in common. The wire electrode feeds into the bore of a connected contact tip and the shielding gas is permitted to escape around the contact tip therebetween and an outer gas nozzle held in assembled relation about the current conducting portion by the inlet and outlet hoses which circulate liquid coolant into and out of the interior of the gas nozzle.

In accordance with this invention, a welding gun has a detachable nozzle comprising a pair of concentric, longitudinally-curved, thin-walled sleeves. The opposed ends of said sleeves are brazed to fore and aft-located mounting bodies each of which has a longitudinal bore which aligns with the bore of the inner sleeve and closes the space surrounding the inner sleeve therebetween and the outer sleeve. The aft-located body provides means by which the curved nozzle is assembled to the gun handle and the fore-located body provides means by which a current pickup tube for the wire electrode and a surrounding gas shield nozzle are mountable to the forward end of the curved nozzle. In an alternate construction, the curved nozzle has an annular chilling chamber fixed about the forward end of the outer sleeve adjacent the fore-located mounting body to which the adapter connects. Inlet and outlet tubes connect to said chamber at opposed sides of the outer sleeve and follow closely along the length of the outer sleeve to the aft-located body to provide for passage of cooling fluid into and out of said chamber.

A feature of the invention is the novel shape of the aft-located mounting body which facilitates connection of the curved nozzle within the welding gun handle, said aft-located mounting body acting as a terminal for access of gas, water and electrical power to the curved nozzle as well as feed of the consumable wire electrode and free flow of air through the handle and about said terminals.

In its illustrated form, the aft-located mounting body has a cross-shape form which provides relatively large spaces at regular intervals about its periphery which accommodate air flow through the tubular shaped handle.

A further feature of the invention is the utilization of an inexpensive replaceable sheath of electrically insulative material which is snugly fitted about the curved nozzle and extends the full length thereof between the aft-located mounting body which is located internally of the insulated tubular handle and the fore-located mounting body to electrically isolate the current conducting sleeves comprising the curved nozzle.

In accordance with this invention, said sheath may be of the type which slidably fits over the outer sleeve and is retained between the fore and aft-located mounting bodies. In its preferred form, it comprises a heat shrinkable material which forms a snug contour fit about the outer sleeve and also the annular chilling chamber and the communicating inlet and outlet tubes of the alternate construction.

A particularly important feature of the invention is the provision of the fore-located mounting body with means such as external threads which provide for connection of an adapter by which a current pickup tube and a surrounding gas nozzle may be removably assembled to the forward end of the curved nozzle and in line to receive the wire electrode, the insulated gas nozzle being located by the adapter to direct the discharging gas as a shield surrounding the end of the current pickup tube and the electrode wire feeding therefrom.

A companion feature is the arrangement contemplated for electrically insulating the gas nozzle from the metal sleeves and the fore-located body which connects the current pickup tube through the adapter to one side of the power supplied.

A further feature of the invention is that the bore of the curved nozzle inner sleeve constitutes an oversized passageway in which replaceable means may be inserted to accommodate consumable wire electrodes of different diameter and direct their feeding to the current pickup tube.

In one illustrated embodiment of the invention, such means comprises a flexible liner which readily conforms to the curved shape of the passageway through the curved nozzle and has both a length and sufficient shape retention characterization as to be capable of axially centering the wire electrode feeding therethrough to the current pickup tube.

A further feature of the invention is the provision of an annular seat in the wire electrode feeding bore of the aft-located mounting body against which a flange portion of the liner seats and locates the liner for directing the wire electrode through the curved nozzle to the attached current pickup tip.

A further feature of the invention is the large volume gas collecting chamber or manifold which is provided about the full length of the curved nozzle and separate from the wire electrode passageway through the nozzle, which assures good gas shielding coverage about the welding arc while permitting operation at a lower, and therefor more economical, gas rate.

A further feature of the invention is the location of the annular cooling chamber and its communicating inlet and outlet tubes beneath the insulating sheath for maximizing their cooling effect on the nozzle.

A feature companion thereto is the location of the cooling chamber so as to conductively chill both the adapter by which the current pickup tube is connected to the gun nozzle and the insulator nut by means of which the gas nozzle is assembled to the gun nozzle by the adapter.

Still another feature of the invention is the novel shape afforded the gas nozzle which minimizes heat transfer from its outer end adjacent the welding arc to the insulator nut.

Another feature of the invention is the arrangement of the inlet and outlet tubes on opposite sides of the outer sleeves so that they both follow closely the curved shape of the outer sleeve to maximize chilling of the outer sleeve. The arrangement also enforces a division of fluid flow through the cooling chamber to maximize its cooling effect on the adapter and insulator nut as well as the forward end of the curved nozzle.

A particularly important feature of the invention is the simplicity of the curved gun nozzle construction, its component parts and their arrangement, which provides a positive seal of the component parts without the use of O-rings and the accompanying problems. At the same time, the construction is one that permits ready break-down of the curved nozzle into its component parts to facilitate removal and replacement of a damaged part or parts. At the same time, the construction promotes maximum versatility including interchange of component parts, as for example, a selection of adapters and collets, differently sized pickup tubes and gas nozzles as well as different thickness of consumable wire electrodes as required to satisfy different welding operations.

Still another feature of the invention is the novel assembly and arrangement of the welding controls actuator on the gun housing with its provision for adjusting the sensitivity and response of the switch to the operator's grasp in actuating the same. The invention also provides a novel strain relieved connection of the electric conductors with the operating switch.

Many other objects, advantages and features of the invention will be at once apparent or will become so upon consideration of the preferred embodiments of the invention which now will be described in connection with the accompanying drawings.

Referring therefore now to the drawings:

FIG. 1 illustrates in side elevation a first embodiment of the invention in welding gun;

FIG. 1a is a partially fragmented sectional view taken through the gun of FIG. 1 and illustrates the assembly of the switch and its conductors in the switch housing attached to the gun housing;

FIG. 1b is a sectional view taken along line 1b—1b in FIG. 1a to show further details of said assembly;

FIG. 2 is a sectional view taken through the gun illustrated by FIG. 1 and shows one form of adapter and gas nozzle and current pickup tube which may be attached to the forward end of the curved nozzle, the same being illustrated in an exploded or separated relation to the curved nozzle which embodies the invention;

FIG. 2a is a view on an enlarged scale showing the assembly of the inner and outer sleeves of the curved nozzle to the aft-located mounting body;

FIG. 2b is a view on an enlarged scale showing the assembly of said inner and outer sleeves to the fore-located mounting body of the curved nozzle;

FIG. 3 is a sectional view taken through the handle along line 3—3 of FIG. 1 looking in the direction indicated by the arrows and shows the novel configuration of the aft-located mounting body assembled within the tubular handle of the welding gun;

FIG. 4 is a cross sectional view taken through the curved nozzle along line 4—4 of FIG. 1 looking in the direction indicated by the arrows;

FIG. 5 is a longitudinal sectional view taken through the curved nozzle, the same being partially fragmented, and illustrates the curved nozzle liner, with an adapter and current pickup tube connected to the fore end thereof;

FIG. 6 is a sectional view taken along line 6—6 of FIG. 2 and illustrates details in the construction of the fore-located mounting body and particularly the arrangement of its gas discharging ports;

FIG. 7 is an end view of the illustrated form of adapter which is connected to the curved nozzle, the view being taken along lines 7—7 of FIG. 2 and looking in the direction indicated by the arrows;

FIG. 8 is a partially segmented and fragmented view of a welding gun and illustrates an alternate construction of a curved nozzle which is water-cooled, the current pickup tube, and component parts of the gas nozzle being illustrated in exploded relation to the adapter shown secured to one end of the curved nozzle;

FIG. 8a is a longitudinally sectioned view of the gas shield nozzle and current pickup tube shown assembled on the adapter and to the fore end of the curved gun nozzle;

FIG. 9 is a sectional view taken through the curved nozzle of the FIG. 8 embodiment and shows the adapter and removable wire electrode liner in exploded relation thereto;

FIG. 10 is a rear end view of the curved nozzle, the view being taken from the position indicated by line 10—10 in FIG. 9;

FIG. 11 is a sectional view taken along line 11—11 of FIG. 10 looking in the direction indicated by the arrows and shows the passageway for gas through the aft-located mounting body of the curved nozzle to the gas manifold which is defined between the assembled inner and outer sleeves;

FIG. 12 is a sectional view taken along line 12—12 of FIG. 10 looking in the direction indicated by the arrows and shows the passages for water through the aft-located mounting body from the water supply hose connector and to the water discharge hose connector which in the illustrated embodiment also embodies the power cable;

FIG. 13 is a view of the aft-located mounting body and shows the end thereof opposite to that illustrated by FIG. 10;

FIG. 14 is a sectional view taken along lines 14—14 in FIG. 9 looking in the direction indicated by the arrows and shows details of the water cooling chamber and its connections to the inlet and outlet tubes; and FIG. 15 is an end view of the fore-located mounting body as viewed from line 15—15 of FIG. 9.

Referring now more particularly to the several views wherein like parts are identified by like reference numerals, FIG. 1 illustrates a welding gun generally by reference numeral 10. Said welding gun 10 comprises an open ended insulated tubular handle body 12 in the forward end of which is detachably mounted a curved nozzle indicated generally at 14. At the forward end of said curved nozzle is removably attached a gas nozzle body indicated generally at 16 which directs gas outwardly from its forward end in the form of a shield G encircling the arc which is produced at the work W by the electrode E as it feeds from the current pickup tube 18 toward the work in the welding operation.

At 20 is an actuator which is operable to close a normally open switch 24 contained in a housing 22 fixed to the underside of the gun handle tubular housing 12 as by a clamp ring 26 which passes through a provided slot 220 of said housing 22. Closing of switch 24 is effective to energize a control circuit including leads 281, 282 (FIG. 1a) of conductor 28 which connect to controls (not shown) for closing the welding circuit advancing the consumable wire electrode E through the gun 10 toward the work W and feeding gas to the gun for discharge about the arc during the welding act.

FIG. 1a shows switch 24 longitudinally adjustably mounted within a provided cavity 221 of switch housing 22 and locked in place by tightening of a set screw 222 (FIG. 1b). Switch 24 is provided with a spring-biased depressible element 243 which normally acts on actuator 20 shown pivotally connected at 224 to the switch housing causing its stop portion 241 to engage the underside of the switch housing 22 in the "open" mode of the switch 24. Grip portion 201 of the actuator 20 is so located that it may be contained within the grasp of the operator's hand about the welding gun handle 12 and squeezed to engage and depress element 243 to close the switch. By loosening set screw 222, switch 24 may be moved inwardly or outwardly of its receiving cavity 221 to change the angle through which the actuator must be pivoted to open or close the circuit containing the switch 24. Thus, means are provided by which the sensitivity and response of the switch operated controls can be readily adjusted to suit the requirements of individual operators. Spaced above the switch receiving cavity 221, switch housing 22 is provided with a pair of fore and aft-extending channels 225 in one of which conductor 28 may be located with its leads 281, 282 attaching to the terminals on the inner side of said switch 24. As shown in FIG. 1a, advantageously, a brass retainer 283 is swedged about conductor 28 and a provided set screw 226 (FIG. 1b) engages thereagainst to lock the conductor 28 within the channel 225. Slot 121 in the handle housing 12 provides entrance for the conductor 28 which therefor can conveniently pass through the handle housing 12 and out its aft end with the other utility lines as hereinafter described. As illustrated by FIG. 1a, said slot 121 is intentionally located close to the switch housing 22 such that conductor 28 must be turned substantially through a first right angle in order to enter the slot and then be bent against a second right angle in order to exit through the aft end of the tubular housing 12. Thus, the conductor is conveniently locked in the handle housing 12 and strain on the connection of the conductor leads 281, 282 to the terminals of switch 24 is minimal.

Referring now to FIG. 2, curved nozzle 14 of the illustrated welding gun, in accordance with this invention, comprises a pair of concentric, longitudinally-curved inner and outer sleeves (32, 30) of electrical conductive metal. In the presently preferred embodiment of the connector, the outer sleeve 30 is of copper and the inner sleeve 32 is of brass. Outer sleeve 30 has an inside diameter substantially greater than the outside diameter of the inner sleeve 32 and therewith creates a large volume annular-shaped space 34 which serves as a gas collecting chamber or manifold extending the full length of the inner sleeve 32. The rearward ends of said concentric sleeves 30, 32 seat within a provided socket 36 (FIG. 2a) of an aft-located first mounting body 38 of bronze or other electrically conductive metal which is located within the forward end of the tubular handle body 12 (FIG. 2) and is detachably held in place therein by a screw 40 which connects to the mounting body 38 in a provided threaded hole 42. The opposed end of said chamber 34 is closed by a fore-located mounting body 44 to which the forward ends of said concentric sleeves are fixed. As shown best in FIG. 2a, socket 36 has an outer annular surface 46 to which the forward end of the outer sleeve 30 is silver-brazed about its full circumference. It also has an inner annular surface 48 concentric with said outer annular surface 46 to which the inner sleeve 32 is silver-brazed such that the two sleeves are securely fixed in a spaced concentric relation. Bore 50 of the inner sleeve 32 communicates through the reduced end or neck 52 of an aligned socket in the opposite side of the aft-located mounting body 38 to receive the aforementioned consumable wire electrode E which is fed into said socket through its casing which is fixed in said socket 54, as by set screw 56. Central bore 50 of inner sleeve 32 thus constitutes a through passageway for the consumable wire electrode to the current pickup tube 18.

Referring now to FIG. 2b, the forward ends of sleeves 30 and 32 are also securely fixed to a second mounting body 44 of electrically conductive metal such as brass having a central bore 68 which approximates the inside diameter of the inner sleeve 32. The inner wall of said central bore 68 is stepped at 70 to provide a seat to which the fore-end of the inner sleeve 32 is fixed, preferably, as by silver-brazing. The outer side of said fore-located mounting body 44 also is stepped at 72, so as to receive the adjacent end of the outer sleeve 30 and is also silver-brazed thereto in order to complete assembly of the fore-located mounting body to the concentric sleeves and thereby maintain said sleeves in a predetermined fixed relation to each other.

Considering also FIG. 6 with FIGS. 2 and 2b, the fore-located mounting body 44 is illustrated as having axially extending passages 74 which extends lengthwise through its wall at regularly spaced intervals. These passages communicate with the interior of the space 34 (FIG. 2) maintained by the sleeves therebetween and so constitute exits through which gas within the manifold 34 discharges. As illustrated in FIG. 2, one end of said gas manifold 34 communicates through intersecting bores or ports 76 and 78 in aft-located mounting body 38 to a gas hose connector 80 which connects to a hose exiting from the heat end of the gun handle 12 and to a conventional gas supply.

In accordance with this invention, the inner diameter of the inner sleeve 32 is intentionally over-sized so that the gun can be used with wire electrodes of different gauges or diameters in order to satisfy specific work requirements. As shown by FIGS. 2 and 5, a liner 58 having an inner diameter corresponding to the gauge of the selected wire electrode and thereby also the inner bore of the current pickup tube 18 is removably inserted through socket 54 into said electrode passageway 50 of the curved nozzle prior to connection of the electrode casing within said receiving socket 54. Liners 58, in accordance with the invention, preferably comprise a coiled wire helix having sufficient flexibility that they readily conform to the arcuate shape of the passageway 50 through the inner sleeve. The wire making up said helix, however, is also sufficiently tightly wound that in the absence of lateral force acting thereon, it tends to assume a straight line in the direction in which the liner is disposed by the curved shape of sleeve 32 into which it is inserted. Preferably, the liners 58 have a flanged outer end 60 (FIG. 5) which engages annular seat 62 at the base of socket 54 about reduced end 52 (FIG. 2a). With flange 60 engaging said seat, the liner is properly located with its fore-end 64 extending through the fore-located mounting body 44 and in position to engage the recessed inner end of the current pickup tube 18 (FIG. 5) when fixed to the curved nozzle 14 by adapter 66 as afterwards explained.

Aft-located mounting body 38 also includes a socket 84 (FIGS. 2 and 3) accessible from its rear side in which one end of a cable conductor leading from an electrical supply power source is electrically connected to said aft-located mounting body 38 of the curved nozzle. The current pickup tube 18 and its adapter 66 when fixed to the fore-located mounting body 44 are thereby electrically connected through the inner and outer sleeves 30, 32 and end-located mounting bodies 38, 44 of the curved nozzle to one side of the electrical power source, the other side of the power source being electrically connected to the work W such that with closing of switch 24, a welding arc is produced between the electrode E and the work in the welding act.

A feature of this invention is that the aft-located mounting body 38 of the curved nozzle is located inwardly of the adjacent end of the tubular housing of electrically insulative material which comprises the handle 12; and the outer sleeve 30 is enclosed along its full length by a snugly fitting sheath 86 of a suitably electrically insulative material such as fibre impregnated rubber or similar synthetic resin. The sheathed curved nozzle thus extends beneath the overhang 12a (FIG. 5) of the handle, and the gun user is protected against accidental contact with the electrically conductive metal sleeves 30, 32 or its mounting body 38 affixed to said sleeves.

A feature of this invention is the utilization of an adapter 66 which detachably connects to the forward end of the curved nozzle and constitutes means to which a current pickup tube 18 and a gas shield directing outer nozzle body 16 are removably assembled so as to assume properly related positions one to the other and to the curved nozzle 14 itself. The adapter 66 thus permits ready replacement of a damaged gas nozzle or current pickup tube. It also facilitates interchangeable use of current pickup tubes which may be of different length and bore sizes as well as interchangeable use of different sized gas nozzles, all of which contributes to the increased versatility of the welding gun.

Referring therefore now to FIG. 2, it will be seen that adapter 66 comprises a member of electrically conductive metal having a first internally threaded end bore 88 which threadedly connects about the externally threaded forward end 90 of the fore-located mounting body 44 of the curved nozzle 14. It also has a second internally threaded oppositely disposed end portion 92 of smaller outside diameter into which a collet nut 108 threadedly connects. Between said internally threaded end bores 88 and 92 is a reduced neck portion 94 having a communicating opening 96 therethrough and a surrounding annular conical wall 98 comprising the base of the larger-diametered end bore 88. Said annular conical base wall 98 contains a plurality of equi-spaced forwardly inclined apertures 100. When externally threaded end 90 of the fore-located mounting body 44 of the curved nozzle is fully received within larger diametered bore 88 of the adapter 66, the adapter abuts the forward end of the sheath 86 as illustrated in FIG. 5 and the forward end of the mounting body 44 abuts the outer circumference of the conical base wall 98 providing an open area 102 into which gas discharging from the gas manifold 34 through passages 68 discharges and exits through said apertures 100 externally of the adapter. The adapter may be locked in said position by tightening set screw 104 in provided opening 106 in the adapter and against the outer sleeve 30. Current pickup tube 18 is inserted through the central bore of the collet nut 108 until its recessed end 110 abuts the reduced neck portion 94 and aligns with the communicating opening 96 therethrough. The current pickup tube 18 is then fixed in position by tightening the collet nut 108 within the receiving end bore 92 of the adapter 66.

As previously mentioned, gun liner 58 is of a length such that it engages conical wall 98 and is centered thereby with opening 96 with which the conical recessed end 110 of the current pickup tube 18 is aligned by collet nut 108 when fixed in adapter 66. The thus centered gun liner assures uninhibited entrance of the consumable wire electrode E into and through bore 112 of the attached current pickup tube. The end of the gun liner abutting the conical end wall 96 of the adapter cavity 88 effectively inhibits gas discharging from passages 74 from entering the current pickup tube 18 and said gas exits through the aforementioned inclined apertures 100 in said conical end wall 98. Collet 108 is illustrated as having a slotted end wall 114 such that when tightened within the internally threaded end bore 92 of the adapter 66, the current pickup tube 18 is held therein by friction. It is important that the current pickup tube 18 be located far enough into the collet that it engages about the opening 96 through the reduced neck portion of the adapter. Alternatively, adapter 66 may be internally threaded for connection of current pickup tube 18 of the type having an externally threaded connecting end (FIG. 8a).

Referring now to FIG. 5, a molded insulator nut 120 having threaded insert 122 is next assembled on the adapter by threadedly connecting said insert 122 on the external threads 124 of the adapter 66. Insulator nut 120 when fully tightened on the external threads 124 of the adapter overlaps the juncture of the adapter with sheath 86. Insulator nut 120 also has external threads 126 to which the internally threaded larger end 128 of the gas nozzle body 16 is threadedly connected. As indicated in FIG. 2, said gas nozzle body 16 may be provided with a replaceable nozzle tip 130 having an externally threaded reduced end section 132 which is threadedly connected within the smaller diameter end of the gas nozzle. As illustrated by FIG. 5, gas nozzle body 16 encircles the connected end of the current pickup tube to inhibit lateral discharge of the shielding gas from apertures 100 and direct the gas in a forward direction along the length of and about the current pickup tube. The gas discharging from the open end of the nozzle tip 130 forms an annular shield about the arc which shields it from ambient air in the operation of the gun (FIG. 1). Preferably, as also illustrated in FIG. 1, gas nozzle 16 including its tip 130 will have a length somewhat shorter than required to fully contain the current pickup 18 to permit the operator's view of the arc and forming puddle. The related length of the gas nozzle and the current pickup arm, however, in accordance with this invention, is a matter of workman's choice.

As aforementioned, the connection of the conductor into receiving socket 84 of the aft-located mounting body 38 of the curved nozzle 14 completes a circuit when the trigger 20 is energized through said mounting body 38, the inner and outer sleeves 30, 32 of the curved nozzle, its fore-located mounting body 44, adapter 66, collet 108 and the current pickup tube 18 to the consumable wire electrode E as it passes through the current pickup tube 18 to the work W. These electrically conducting portions of the gun comprising a path for the welding circuit are insulated from the operator, first by the tubular housing constituting the handle 12 and, secondly, by sheath 86 which extends the length of the outer sleeve 30. The attached portions of the gun disposed forwardly of the curved nozzle 14 which include the adapter 66a current pickup tube 18 are also insulated by the insulator nut 120 which overlies the juncture of the adapter 66 with said sheath 86, and by the nozzle body which is threadedly connected to said insulator nut 120 and thereby electrically insulated from the adapter 66, said nozzle body 16 and its replaceable tip 130 being electrically insulated from the current pickup tube by the surrounding air space through which the gas flows to the forward end of the nozzle body.

Additionally, in accordance with this invention, and it is a feature thereof, transfer of heat from the nozzle tip 130 to the inner end 126 of nozzle 16 which connects to the insulator nut 120 is obstructed by providing a narrow annular wall section 161 of reduced thickness therebetween. As shown in FIG. 2, the I.D. of the outer nozzle end portion 133 is substantially less than the I.D. of the rear nozzle end portion 126 and the outer side of the forward end of the nozzle 16 is tapered along a shallow angle of say 5° to 10° from behind section 161 to an O.D. at the forward end of the nozzle approximating the I.D. of the inner nozzle end portion 126. The thickness of annular wall section 161 is thus substantially less than either the wall thickness of end portion 126 which threadedly connects to adapter 66 or end portion 133 to which the nozzle tip 130 threadedly connects and said lesser wall thickness permits minimum thermal conduction of heat from the welding area by the nozzle 16.

Referring also now to FIG. 3, a feature of the invention is that the aft-located mounting body 38 has been given a generally cross or cruci-form shape in cross section. Said mounting body 38 thus has regularly spaced arms 134 which are of suitable length and have arcuate shaped end surfaces 136 which snugly engage the interior circular wall of the handle body 12. The recesses 138 between said arms 134 provide access between the open ends of the tubular handle body 12 for free flow of cooling air through the full length of the handle body and out the open ends thereof for cooling and rendering the handle comfortable to hold.

The welding gun as thus far described and illustrated in FIGS. 1 through 7 is a "dry" gun in the sense that it does not rely on or use water or other chilling fluid for cooling of the curved nozzle or its other component parts which are subject to heating by reason of their proximity to the welding arc.

Referring now to FIGS. 8, 8a and associated FIGS. 9 through 15, a second and alternate construction of a curved nozzle for a welding gun in accordance with the invention is illustrated. This second embodiment of the invention there illustrated is generally similar in structure to the first described embodiment. It, however, includes additional structure for effectively chilling the curved nozzle and by conduction also the adapter and current pickup tube as well as the insulator nut by which the gas nozzle 16 is attached thereto in use of the welding gun. In said second embodiment chilling fluid such as water from a water hose connected to a suitable source and leading into the rear of the gun handle 12 is ported through the aft-located mounting body 38 (FIG. 8) and flowed along first one side of the outer sleeve 30 (FIG. 8a) to the outer end of the curved nozzle 14 where after encircling the nozzle is returned along the opposite side of the outer sleeve 30 and ported back through the aft-located mounting body to a water discharge hose.

Thus, referring to FIG. 9, a curved nozzle in this second embodiment of the invention like the first described embodiment comprises an inner sleeve 32 having an outer sleeve 30 arranged thereabout in concentric spaced relation, both sleeves being longitudinally curved and having their opposed ends fixed to an aft-located mounting body 38 as in the earlier described first embodiment of the invention. The forward ends of said concentric sleeves 30, 32 are connected to a fore-located mounting body 44 also in the manner as previously described. Said fore-located mounting body 44 is externally threaded at 90 to permit assembly therewith of the aforedescribed adapter 66.

In this embodiment of the invention, adapter 66 is illustrated (FIG. 8) provided with an internally threaded fore end 92 to which the externally threaded end 181 of an alternate construction of current pickup tube 18 may be threadedly connected and so as to obviate the need of a collet 108 such as illustrated in the first described embodiment. Threadedly connected over adapter 66 is an outer gas shield nozzle 16 (FIG. 8a) which may have a removable tip 130 as previously described.

In this second embodiment of the invention, the aft-located mounting body 38 also has a socket 54 (FIG. 9) which communicates with the central bore of the inner sleeve 32 and serves as a passageway for the consumable wire electrode which enters bore 50 of the inner sleeve 32 through opening 52 from socket 54 and passes therefrom through the adapter and into the bore of the current pickup tube. Aft-located mounting body 38 also has a gas hose connector 80 (FIG. 11) which is ported at 76, 78 into the surrounding space 74 between the inner and outer sleeves. Said space 34 constitutes a gas chamber or manifold from which the gas discharges through provided passages 68 in the fore-located mounting body 44 into the adapter and therefrom through openings 100 into the surrounding space defined by the outer gas nozzle body 16.

A feature of this embodiment of the invention is that a cooling chamber forming member 140 is rigidly fixed as by brazing to the forward end of the outer sleeve 32 in encircling relation therewith. As shown best in FIG. 8a, member 140 is so positioned that when the adapter 66 is fully tightened on its threaded connection to the fore-located mounting body 44, and insulator nut 120 on its threaded connection to the adaptor, both are in good temperature conductive contact with the metal wall of said chamber forming member 140 so as to be cooled by the passage of chilling fluid through said chamber. Cooling fluid is fed into said chamber-forming member 140 via an inlet tube 142 (FIGS. 9, 14) which is located to follow closely along a major portion of the length of the curved outer sleeve 30, said inlet tube separating therefrom immediately adjacent the mounting body 38 where it is received within a provided recess or socket 144 (FIG. 12) in the forward side of said aft-located mounting body 38. Said inlet tube 142 is suitably ported via serially connected bores 146, 148 and 150 to an inlet water hose fixture or connector 152 which is approximately silver-brazed in an enlarged end portion of bore 150. Water from a supply source connected to said fixture 152 is thus able to flow along one side of the outer sleeve effectively chilling said sleeve as it passes along the length thereof and into the interior of the chamber-forming member 140 with which the inlet tube is ported at one side of the outer sleeve. At 160 (FIGS. 8, 9, 14) is an outlet tube which communicates with the interior of said chamber member 140 diametrically opposite said communication of the inlet tube therewith. Said outlet tube 160 follows closely the opposed side of the outer sleeve 30 separating therefrom adjacent the aft-located mounting body 38 where its rearward end is received in a provided recess 164 (FIG. 12) which is ported by bore 166 to the previously mentioned power cable mounting socket 110. In this alternate embodiment of the invention, a fixture 170 (FIG. 9) is fixed within said bore 110. The fixture 170 is hollow and adapted for connection of a water hose not shown. The wall of said water hose constitutes a power cable connected to the power source and renders the aft-located mounting body electrically live through the connector 170. Preferably, both the inlet and outlet tubes are brazed to the outer sleeve along their length to assure an intimate contact and permanent assembly therewith for maximum heat transfer by conduction. Outer sleeve 30, said inlet tube 142 and outlet tube 160, as well as the encircling cooling chamber 140 are also enclosed along the full length of the curved nozzle 14 between its end mounting bodies 44 and 38 by a sheath 86 which snugly fits thereabout (FIG. 9). In this embodiment of the invention, said sheath preferably comprises an oversized tube of heat shrinkable synthetic resin material which is heat shrunk by applying heat from a torch, causing the tube to shrink and conform to the irregular shape presented by the longitudinal extension of the inlet and outlet tubes along the length of the outer sleeve as well as the cooling chamber 140 at the forward end of the outer sleeve. Said sheath 86 serves both to electrically insulate the component sleeves and water inlet and outlet tubes of the curved nozzle from accidental contact or grounding and also to confine the chilling effect of the circulating water to maximize its cooling effect on the outer sleeve 30, insulator nut 120 and the adapter 66 with which it engages when the adapter is fully threaded onto the fore-located mounting body 44. To assure good conductive contact between the insulator nut and adaptor with the chamber 140, any portions of sheath 86 overlapping the fore side of the chamber 140 are first trimmed. As illustrated by FIGS. 9, 14 chamber-forming member 140 is annular in cross section and has a substantially U-shape so that the chilling water circulating therethrough is in direct contact with the outer sleeve 30. As previously mentioned, the connection of the inlet and outlet tubes to the interior of said cooling chamber 140 are located diametrically opposite each other, wherefore, water entering one side of the chamber flows along both sides of the outer sleeve to reach the water outlet tube and the chilling effect of the water on the adaptor and insulator nut is maximized.

It will be appreciated that all of the assembled parts of both embodiments as thus far described are silver-brazed so as to obtain gas and/or water tight connections without the need of employing O-rings and that these connections are rigid and strong, resisting separation in normal utilization of the welding gun. However, by simple application of heat to the silver-brazed areas, it is possible to readily separate the curved nozzle into its component parts after slitting the sheath which is inexpensive and can be readily replaced. Thus, any part or parts of the curved nozzle that have been damaged can be repaired and/or replaced with minimum effort and breakdown time. Also, as explained above, the adapter permits the gun to be utilized with current pickup tubes of different length and bore size as well as to substitute different shielding gas nozzles to satisfy particular welding requirements. Additionally, the invention is particularly adapted as a dry gun or as a water cooled gun. Also, either of the described alternate embodiments of a curved nozzle may be assembled with the described handle and adaptor 66 may be interchangeably connected to either curved nozzle 14, thus further increasing the utility of the welding gun to the user.

From the aforedescription of the two embodiments of the invention, it will be appreciated that all the recited objects, advantages and features of the invention have been demonstrated as obtainable in a highly practical and economical structure to manufacture as well as utilize.

The invention thus having been described I claim:

1. In a gas shielded arc welding gun having a handle of electrically insulative material, a curved nozzle embodying concentric, longitudinally-curved inner and outer sleeves of electrically conductive metal, and fore and aft-located mounting bodies of electrically conductive metal to which the respective ends of the sleeves are silver brazed in gas sealing relation, the aft-located mounting body being releasably securable within the gun handle and having a passageway which aligns with the bore of the inner sleeve and into which a consumable wire electrode feeds, the fore-located mounting body having a center bore which aligns with the inner sleeve bore to receive the wire electrode fed therethrough, said fore-located mounting body being externally threaded for mounting of an adapter by which a current pickup tube is connected to the curved nozzle in line with said inner sleeve bore, the inner and outer sleeves defining an annular gas collecting chamber therebetween and said fore and aft located mounting bodies, said chamber being ported through the aft-located mounting body for connection to a gas supply and being ported through the fore-located mounting body to discharge the gas about the current pickup tube, and an external sheath of insulating material snugly fitting about said outer sleeve along the length thereof between said fore and aft-located mounting bodies.

2. A curved nozzle as claimed in claim 1 wherein the aft-located mounted body includes a socket into which the adjacent ends of the sleeves extend, said socket having spaced inner and outer concentric walls to which the inner and outer sleeves are respectively brazed and a central opening axially centered with the wire electrode feeding passageway of the aft-located mounting body.

3. A curved nozzle as claimed in claim 2 wherein the aft-located mounting body includes a gas supply hose connector fixed thereto and a port through the aft-located mounting body which communicates at one end with said hose connector and opens through the base of said socket between its inner and outer concentric walls to which the inner and outer sleeves are brazed.

4. A curved nozzle as claimed in claim 1 containing means within the bore of the inner sleeve which axially aligns the feeding path of the wire electrode with the current pickup tube.

5. A curved nozzle as claimed in claim 2 further including a removably liner of flexible material in the bore of the inner sleeve, said liner having a flanged end which rests on a provided annular ledge in the passageway of the aft-located mounting body, said liner being of a length so that it extends into the adapter when connected to the nozzle to axially align the wire electrode with the current pickup tube.

6. A curved nozzle as claimed in claim 1 wherein the external sheath of insulating material is heat shrunk into intimate contact with and about the outer sleeve.

7. In a gas shielded arc welding gun, having an open-ended tubular handle, a curved nozzle embodying concentric, longitudinally-curved inner and outer sleeves, and fore and aft-located mounting bodies to which the respective ends of the sleeves are fixed in gas sealing relation, the aft-located mounting body having a cross shape which facilitates its snug fitting within the tubular handle of the welding gun and accomodates free flow of air through the handle, being releasably securable within the gun handle and having a passageway which aligns with the bore of the inner sleeve and into which a consumable wire electrode feeds, the fore-located mounting body having a center bore which aligns with the inner sleeve bore to receive the wire electrode fed therethrough, said fore-located mounting body being externally threaded for mounting of an adapter by which a current pickup tube is connected to the curved nozzle in line with said inner sleeve bore, the inner and outer sleeves defining an annular gas collecting chamber therebetween, said chamber being ported through the aft-located mounting body for connection to a gas supply and being ported through the fore-located mounting body to discharge the gas about the current pickup tube, and an external sheath of insulating material snugly fitting about said outer sleeve along the length thereof between said fore and aft-located mounting bodies.

8. In a welding gun, a curved nozzle as claimed in claim 1 having an annular cooling-chamber-forming member fixed to and about the forward end of the outer sleeve, and inlet and outlet tube members having forward ends communicating with the interior of said cooling-chamber-forming member at opposite sides of the outer sleeve, said tube members extending closely along the length of the outer sleeve member and having rearward ends fixed in receiving recesses in the forward side of the aft-located mounting body, and a pair of water hose connectors fixed in the rearward side of said aft-located mounting body and each ported to one of said tube-member-receiving recesses, said tube members and cooling-chamber-forming member being enclosed by said sheath of electrically insulative material.

9. A curved nozzle as claimed in claim 8 wherein the annular-cooling-chamber forming member is positioned to be engaged by and thereby to cool the end of the adapter which threadedly connects with the fore-located mounting body.

10. A curved nozzle as claimed in claim 8 wherein the sheath of electrically insulating material is heat shrunk over the outer sleeve, the annular cooling-chamber-forming member and the tube members along the length of the outer sleeve.

11. A curved nozzle as claimed in claim 8 in combination with an adapter threaded to the forward end of the outer body, an inner-threaded nozzle insulator threadedly connected to the adapter, said nozzle insulator being also externally threaded and a nozzle body threadedly connected to the nozzle insulator in spaced encircling relation about the adapter, a current pickup tube affixed by the adapter to the curved nozzle in line with the central bore of the inner sleeve member and a replaceable gas nozzle tip connected to the outer end of said nozzle body in encircling relation about the current pickup tube.

12. The combination of claim 11 wherein the nozzle body has a narrow encircling annular wall section intermediate the ends thereof which connect to the insulator tip, said annular wall section having a thickness less than said nozzle ends, and said annular wall section being exposed to gas entering the interior of said gas nozzle and about the current pickup tube for discharge through the gas nozzle tip.

13. A curved nozzle as claimed in claim 1 in combination with an internally threaded adapter threadedly connected over and about the forward end of the fore-located mounting body, an inner-threaded nozzle insulator threadedly connected to the adapter, a nozzle body threadedly connected to the nozzle insulator in spaced encircling relation thereabout, a current pickup tube affixed by the adapter to the curved nozzle, and a gas nozzle tip threadedly connected to said nozzle body in encircling relation about the current pickup tube, said gas nozzle body and its tip directing the gas exiting from the fore-located mounting body about the current pickup tube.

14. The combination of claim 13 wherein the nozzle body has a narrow encircling annular wall section intermediate the ends thereof which connect to the insulator and gas nozzle said annular wall section having a wall thickness less than said nozzle ends, and said annular wall section being exposed to gas entering the interior of said gas nozzle and about the current pickup tube for discharge through the gas nozzle tip.

15. The combination of claim 13 further including an open-ended tubular handle, the aft-located mounting body of the curved nozzle having peripherally spaced portions which snugly seat within one open end of the tubular handle, the spaces therebetween accommodating free flow of air through the handle.

16. The combination of claim 11 further including an open-ended tubular handle, the aft-located mounting body of the curved nozzle having peripherally spaced portions which snugly seat against the inner surface of one end of the tubular handle, the spaces therebetween accommodating free flow of air through the handle.

17. In a welding gun, a curved nozzle embodying a pair of concentric, thin-walled, longitudinally curved inner and outer sleeves, an annular space between the sleeves extending the length thereof which is closed by fore located and aft located mounting bodies which are ported to provide entrance of gas into and exit from said space, said mounting bodies further having bores therethrough algined with the bore of the inner sleeve for passage of a consumable wire electrode, and annular cooling-chamber-forming member of U-shape in cross section having its legs brazed water tight to and about the forward end of the outer sleeve, inlet and outlet tube member having forward ends communicating with the interior of said cooling-chamber-forming member at opposite sides of the outer sleeve, said inlet and outlet tube member extending closely along the length of the outer sleeve member and having rearward ends fixed in receiving recess in the forward side of the aft-located mounting body member, and a pair of water hose connectors fixed in the rearward side of said aft-located mounting body and each ported to one of said tube-member-receiving recesses, said tube members and cooling-chamber-receiving recesses, said tube members and cooling-chamber-forming member being enclosed by a closely conforming sheath of electrically insulative material.

18. A replaceable gas nozzle for a welding gun comprising a generally cylindrical open-ended member having a stepped through-bore embodying a first end portion of constant internal diameter separated by a radially-directed annular wall portion from a second end portion of constant but smaller internal diameter, at least the outer ends of said first and second end portions being internally threaed, and a removable nozzle having an externally threaded end portion which threadedly connects with the interiorly threaded second end portion, the outside diameter of said member progressively tapering across the area of said member containing said transversely directed inner separating wall portion to a minor outside diameter at the outer end of said member having a smaller internal diameter bore portion, the wall thickness of said member being least in the annular area thereof containing the transversely directed inner separating wall portion.

19. A replaceable gas nozzle as claimed in claim 18 wherein the end portion having the smaller internal diameter has an axial length shorter than that of the other end portion of the through bore.

20. A welding gun comprising in combination a tubular handle having a consumable wire-electrode-directing and gas shield forming nozzle mounting portion fixed in the fore end thereof, said mounting portion having means on its rear side accessible from the rear open end of the tubular handle by which the gun is connectable to a source of consumable wire electrode and gas, a switch housing attached to the tubular handle having a fore and aft directed cavity open at the aft end thereof, and a normally open switch connected by conductors to controls operable to feed said gas and wire electrode to the gun, said switch being axially adjustable in said receiving cavity of the switch housing and means for locking said switch in an adjusted position in said cavity, said housing containing a fore and aft extending channel above and extending generally parallel to the axis of said cavity, said conductors being attached to terminals of the switch at the fore end of the cavity and extending therefrom through the channel entering the tubular handle through a provided slot therein at the aft end of the channel and exiting through the rear end of the tubular handle, and an actuator pivotally connected to the switch housing having a hand grip portion located to be conveniently gripped in the operator's hand which holds the welding gun by its handle to close said switch.

21. A welding gun as claimed in claim 20 wherein the housing includes second locking means for securing the conductors within the receiving channel.

22. A welding gun as claimed in claim 21 wherein said second locking means inlcudes a metal band swedged about the conductor against which a set screw threadedly connected in the switch housing is tightened to frictionally secure the conductor against the channel wall.

23. A welding gun as claimed in claim 20 wherein the slot in the tubular handle is so located that the conductor must turn through near 90° to enter the tubular handle and then turn through a second near 90° to be directed toward the rear of the tubular handle.

24. In a gas shielded arc welding gun, the combination of an open-ended tubular handle, a curved nozzle having passages extending longitudinally therethrough for directing a consumable wire electrode and gas to its forward end, said curved nozzle having a current pickup tube and a surrounding gas nozzle fixed to its forward end and means fixed to its rearward end which releasably secure said nozzle in the fore end of the handle, said means comprising a cross-shaped mounting body disposed in said end of the tubular handle having passages communicating with the passages of the curved nozzle, said mounting body having circumferentially spaced arms the outer ends of which snugly engage the interior wall of the tubular handle and the spaces therebetween accomodating free flow of air through the handle.

25. In a gas shielded arc welding gun, the combination of an insulated handle to which is separably mounted a nozzle having passage means through which a consumable wire electrode and shielding gas are directed to the forward end of the nozzle, a current pick up tube replaceably affixed to the forward end of said nozzle to receive and direct the consumable wire electrode, a replaceable gas shield comprising a generally cylindrical open-ended member having a stepped through-bore embodying an internally threaded rear end portion of constant internal diameter for replaceable attachment about the forward end of the nozzle so as to receive and direct the sheilding gas therefrom and about the crrent pickup tube and out the fore end of the gas shield, the fore end of said cylindrical member having a constant but smaller internal diameter and internally threaded for replaceable mounting of an externally threaded nozzle tip thereto, said cylindrical member haing a radially directed annular wall portion between said fore and rear internally threaded end portions, and the outside diameter of said cylindrical member progressively tapering across the area of said member containing said radially directed inner separating wall portion to a minor outside diameter at the outer end of said cylindrical member having the smaller internal diameter, the wall thickness of said member being least in the annular area thereof containing the radially directed inner separating wall portion and said annular wall section of least thickness being exposed to gas entering the interior of said gas nozzle and discharging about the current pick-up tube through the fore end thereof to minimize transfer of heat from the nozzle tip.

26. In a gas shielded arc welding gun, the conbination of an open-ended tubular housing having a mounting body fixed in the fore end thereof and a curved nozzle fixed to said mounting body, said curved nozzle having an oversized wire electrode feeding bore extending therethrough, the mounting body having a stepped opening communicating with said bore of the curved nozzle providing a surrounding ledge at the rear end of said curved nozzle bore, and means at the fore end of the curved nozzle for replaceably connecting a current pickup tube in aligned relation with the fore end of said curved nozzle bore, and replaceable liner means insertible in the bore of said curved nozzle to facilitate its feeding of consumable wire electrodes of different diameters through the curved nozzle to the current pickup tube connected thereto, said liner means comprising a coiled wire helix which readily conforms to the curved shape of the nozzle bore, said helix having a flanged portion which seats on said ledge at the fore end of the curved nozzle bore, said helix having an having an inner diameter corresponding to the gauge of a selected wire electrode and receiving current pickup tube connected to the nozzle fore end, said coiled wire helix being of a length to extend through the curved nozzle bore and locate its fore end in centered relation with the current pickup tube.

* * * * *

UNITED STATES PATENT AND TRADEMARK OFFICE
CERTIFICATE OF CORRECTION

PATENT NO. : 4,158,763
DATED : June 19, 1979
INVENTOR(S) : Delford A. Moerke

It is certified that error appears in the above-identified patent and that said Letters Patent are hereby corrected as shown below:

| | | |
|---|---|---|
| Column 11, | line 25, | "approximately" should be --appropriately--; |
| Column 13, | line 29, | "removably" should be --removable--; |
| Column 15, | line 30, | after the comma delete "said tube members"; |
| Column 16, | line 58, | correct the spelling of current; |
| Column 16, | line 63, | correct the spelling of having; |
| Column 18, | line 12, | delet the extra "having an". |

Signed and Sealed this

Second Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,158,763

DATED : June 19, 1979

INVENTOR(S) : Delford A. Moerke

It is certified that error appears in the above—identified patent and that said Letters Patent is hereby corrected as shown below:

The title page and the four sheets of drawings should be deleted to appear as per attachments.

Signed and Sealed this

Seventeenth Day of June 1980

[SEAL]

Attest:

Attesting Officer

SIDNEY A. DIAMOND

Commissioner of Patents and Trademarks

United States Patent [19]

Moerke

[11] 4,158,763
[45] Jun. 19, 1979

[54] CURVED NOZZLE WELDING GUN

[76] Inventor: Delford A. Moerke, 127 E. Morningside Ave., Lombard, Ill. 60148

[21] Appl. No.: 821,743

[22] Filed: Aug. 4, 1977

[51] Int. Cl.² ............................................. B23K 9/28
[52] U.S. Cl. ............................. 219/137.42; 219/74; 219/137.44; 219/137.62; 219/137.63
[58] Field of Search ................. 219/137.62, 137.42, 219/137.44, 74, 137.62, 137.63

[56] References Cited

U.S. PATENT DOCUMENTS

| | | | |
|---|---|---|---|
| 2,952,766 | 9/1960 | Craig | 219/137.42 |
| 3,112,392 | 11/1963 | Orr | 219/137.42 |
| 3,249,734 | 5/1966 | Meyer | 219/137.8 X |
| 3,463,902 | 8/1969 | Bircher | 219/137.62 X |
| 3,529,127 | 9/1970 | Smith | 219/137.9 |
| 3,536,888 | 10/1970 | Borneman | 219/137.44 X |
| 3,689,733 | 9/1972 | Matasovic | 219/136 |
| 3,783,233 | 1/1974 | Molin | 219/137.61 |
| 3,980,860 | 9/1976 | Howell | 219/137.62 |

Primary Examiner—Richard R. Kucia
Attorney, Agent, or Firm—George F. Lee

[57] ABSTRACT

A welding gun has a separable nozzle embodying longitudinally curved inner and outer concentric sleeves, and fore and aft-mounted bodies to which the opposed ends of the concentric sleeves are brazed to define an annular gas manifold between the sleeves into which gas feeds through the aft-mounted body. The aft-mounted body detachably seats within a tubular handle and it contains a bore through which the consumable wire electrode feeds to the central bore of the inner sleeve. The fore-mounted body provides for connection of an adapter by which a current pickup tube is fixed to the curved nozzle in line with its inner sleeve to receive the wire electrode. Said fore-mounted body is ported at spaced intervals for discharge of gas from the manifold through the adapter and about the current pickup tube when assembled thereto. In an alternate structure, inlet and outlet tubes ported through the aft-mounted body follow closely along the outer sleeve to provide passage for cooling fluid to and from an annular chilling chamber fixed about the forward end of the nozzle. The outer sleeve, and in the alternate structure also the cooling chamber and its inlet and outlet tubes, are enclosed along the length of the nozzle by a snugly fitting insulative sheath.

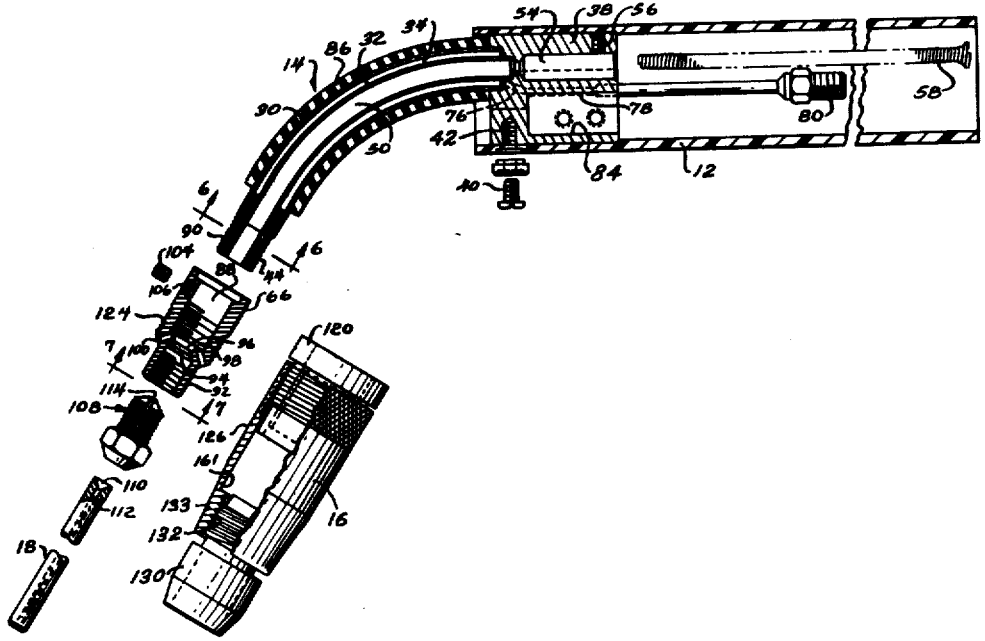

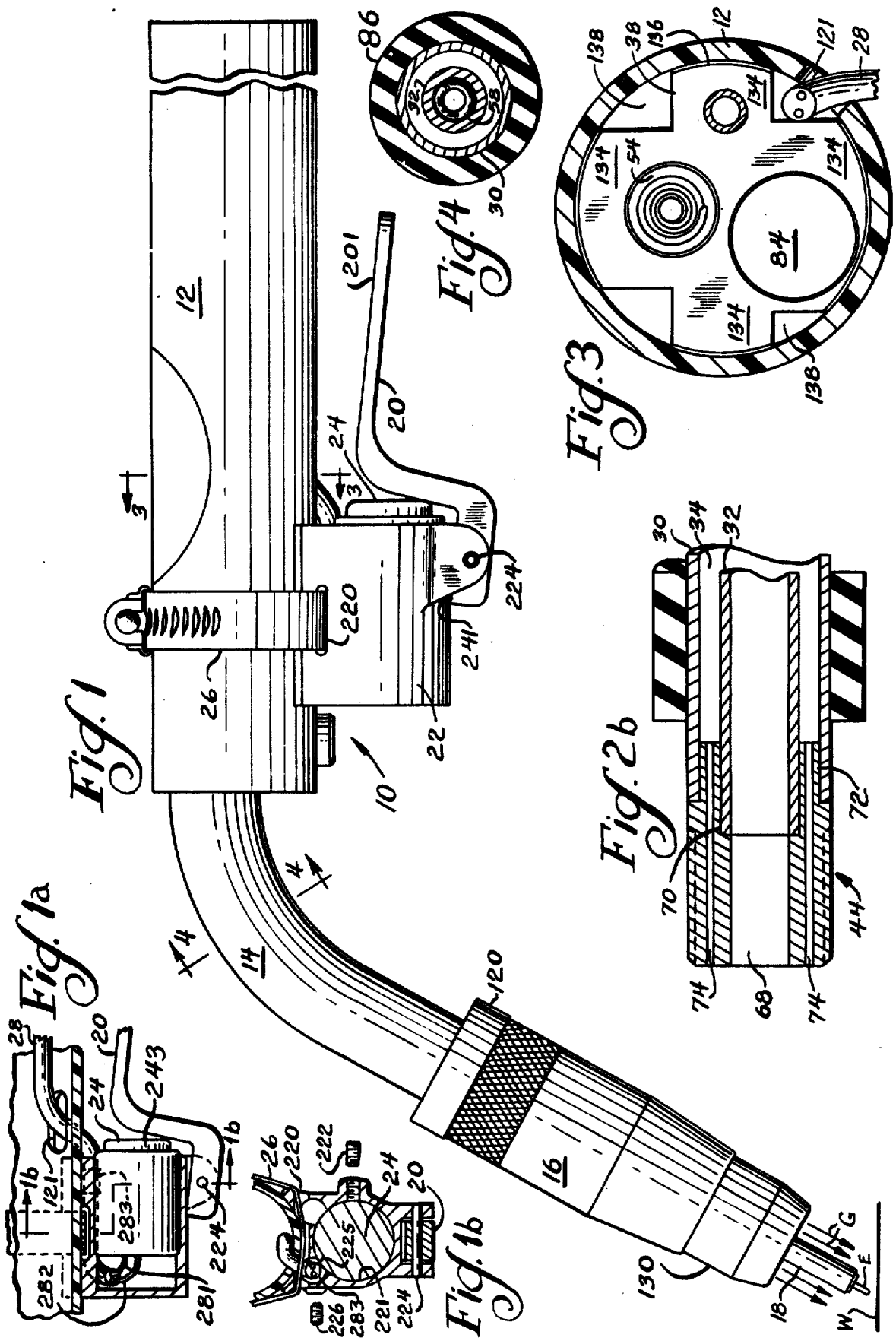

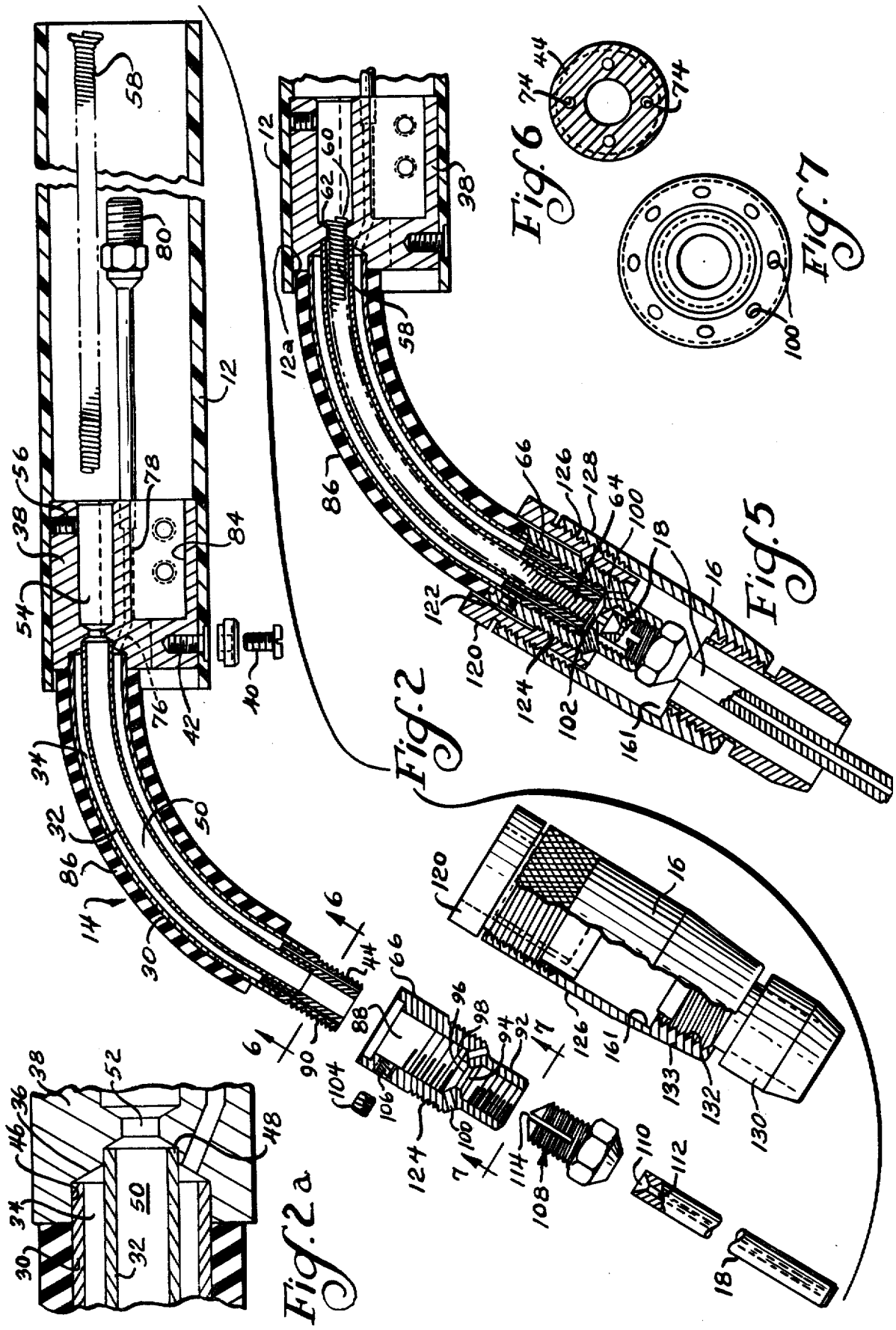

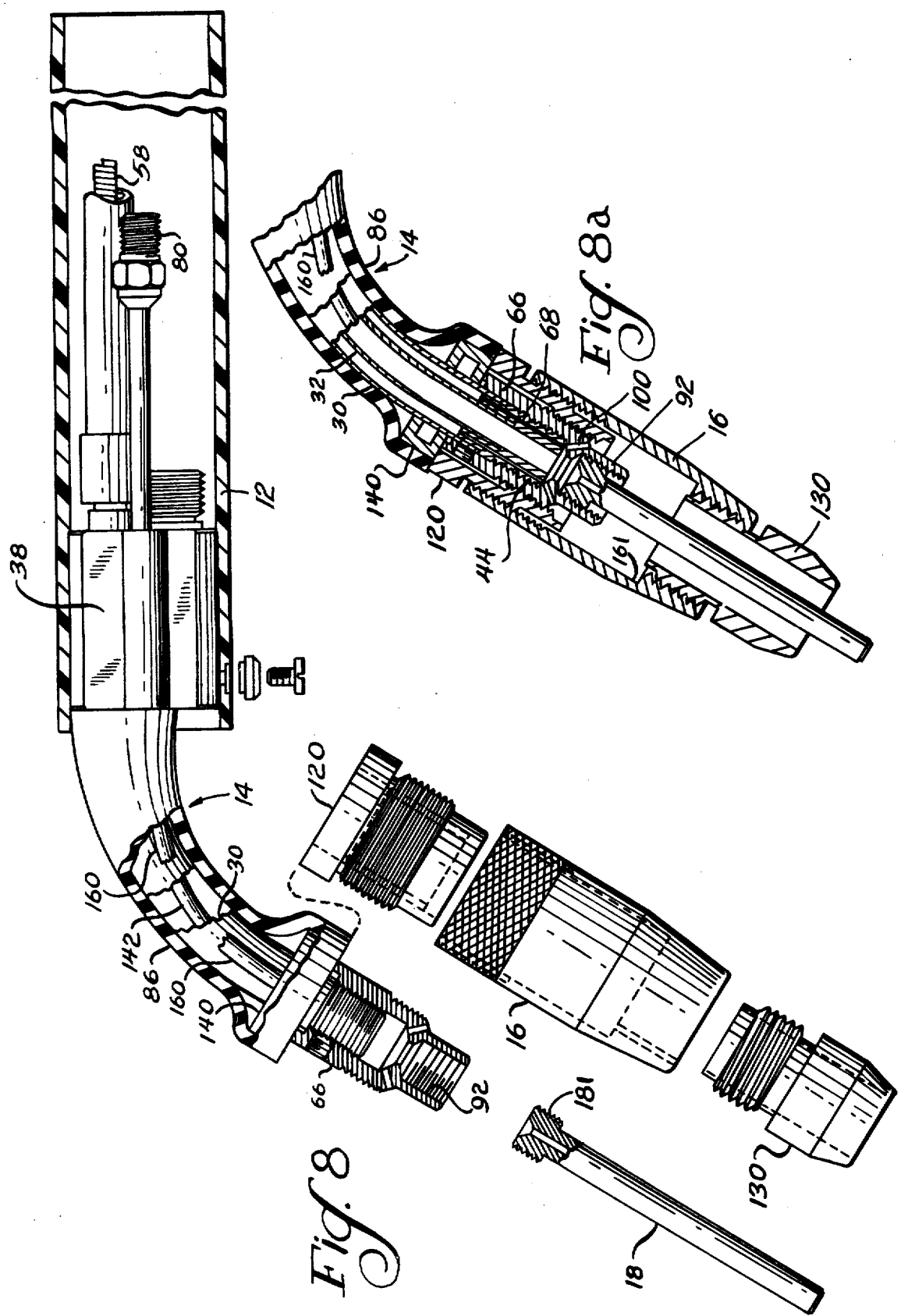

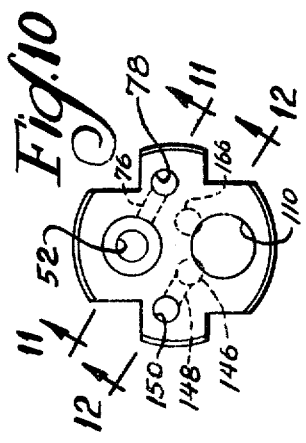
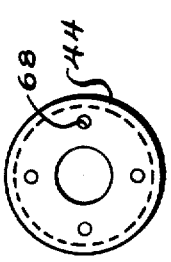
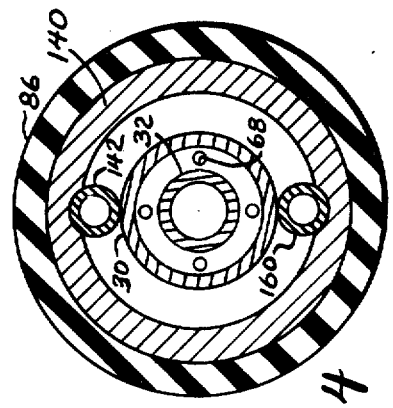
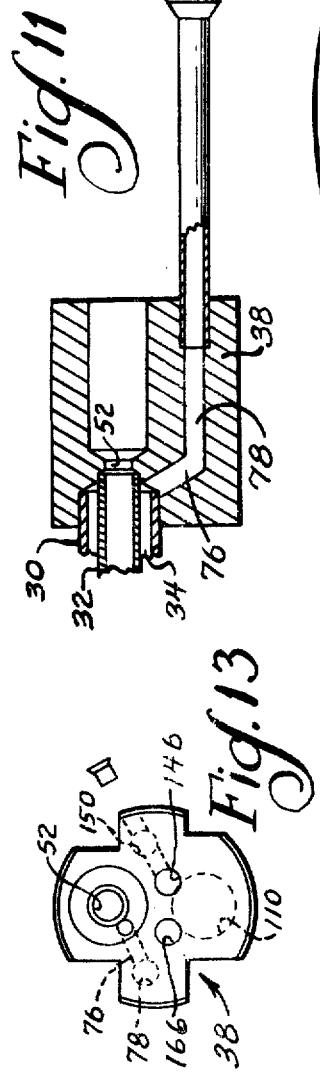
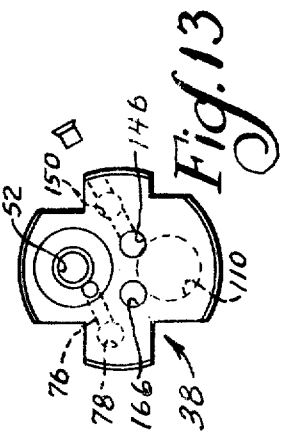
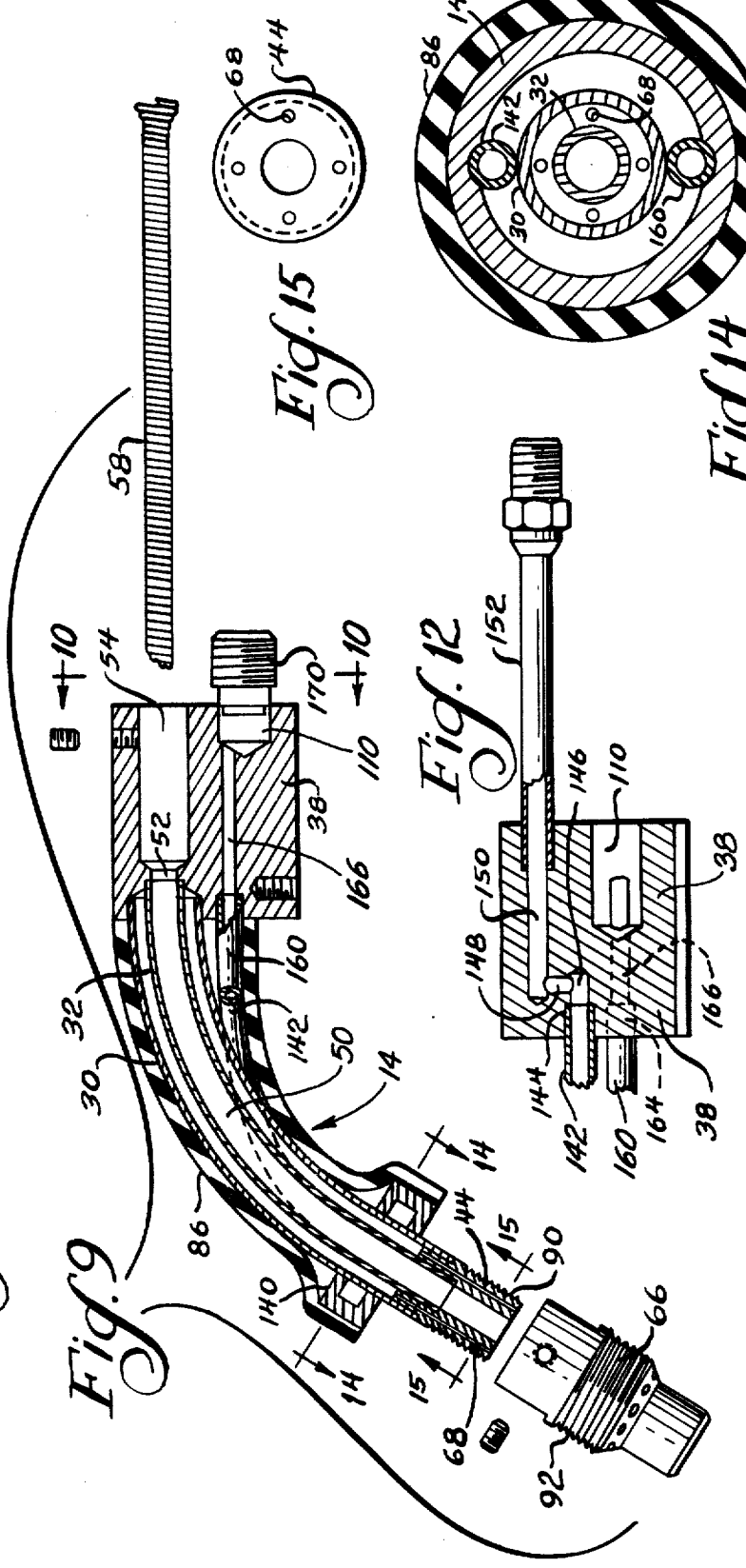

26 Claims, 20 Drawing Figures